United States Patent
Tanaka

(10) Patent No.: US 7,976,432 B2
(45) Date of Patent: Jul. 12, 2011

(54) SEQUENTIAL AUTOMATIC TRANSMISSION

(75) Inventor: Hiroshi Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 11/730,543

(22) Filed: Apr. 2, 2007

(65) Prior Publication Data

US 2007/0232446 A1    Oct. 4, 2007

(30) Foreign Application Priority Data

Apr. 3, 2006   (JP) .................................. 2006-101886

(51) Int. Cl.
    *F16H 61/16* (2006.01)
(52) U.S. Cl. .......................................... 477/125; 477/80
(58) Field of Classification Search .................... 477/125
    See application file for complete search history.

(56) References Cited

U.S. PATENT DOCUMENTS

| | | | | |
|---|---|---|---|---|
| 3,721,136 | A | * | 3/1973 | Irie ................................ 477/125 |
| 4,467,427 | A | * | 8/1984 | Magnusson ....................... 701/62 |
| 5,031,100 | A | * | 7/1991 | Takahashi ........................ 701/55 |
| 5,035,160 | A | * | 7/1991 | Morita ............................ 477/154 |
| 5,601,511 | A | * | 2/1997 | Michioka ......................... 477/98 |
| 6,286,381 | B1 | | 9/2001 | Reed, Jr. et al. |
| 6,397,695 | B1 | * | 6/2002 | Okada et al. ..................... 74/335 |
| 6,837,323 | B2 | * | 1/2005 | Denton et al. ............... 180/65.26 |
| 7,010,405 | B2 | * | 3/2006 | Furuichi et al. .................. 701/51 |
| 7,428,853 | B2 | * | 9/2008 | Tanba et al. ..................... 74/339 |
| 2002/0198630 | A1 | * | 12/2002 | Klein et al. ........................ 701/1 |
| 2005/0072255 | A1 | * | 4/2005 | McCrary et al. ................ 74/330 |
| 2006/0219034 | A1 | * | 10/2006 | Hori et al. ....................... 74/330 |
| 2008/0096721 | A1 | * | 4/2008 | Honma et al. ................. 477/120 |
| 2008/0242502 | A1 | * | 10/2008 | Lin ................................ 477/80 |

FOREIGN PATENT DOCUMENTS

| | | |
|---|---|---|
| DE | 199 37 716 C1 | 11/2000 |
| JP | 2004-28117 A | 1/2004 |
| WO | WO-2004/036079 A2 | 4/2004 |
| WO | WO-2005/018978 A1 | 3/2005 |

* cited by examiner

*Primary Examiner* — Justin Holmes
(74) *Attorney, Agent, or Firm* — Birch, Stewart, Kolasch & Birch, LLP

(57) ABSTRACT

To alleviate a shift shock of an automatic transmission when a vehicle travels at a certain vehicle speed and a speed range is changed over to a drive range from a neutral range. When a neutral range is selected by a range selection lever, a neutral determination part outputs a determination signal Nt. When a vehicle speed V is equal to or more than a vehicle speed reference value Vref, a vehicle speed determination part outputs a signal VJ2. When the vehicle speed V is less than the vehicle speed reference value Vref, a signal VJ1 is outputted. The signal VJ1 is inputted to a shift map, and a hydraulic control unit determines a speed change stage base on the vehicle speed and a throttle opening degree. When a signal VJ2 is inputted to the hydraulic control unit, the shift stage is set at the neutral range.

20 Claims, 4 Drawing Sheets

SEQUENTIAL AUTOMATIC TRANSMISSION

CROSS-REFERENCE TO RELATED APPLICATIONS

The present application claims priority under 35 USC 119 to Japanese Patent Application No. 2006-101886 filed on Apr. 3, 2006 the entire contents of which are hereby incorporated by reference.

BACKGROUND OF THE INVENTION

1 Field of the Invention

The present invention relates to a sequential automatic transmission, and more particularly to a sequential automatic transmission which can preferably suppress an impact (shift shock) at the time of performing transmission.

2 Description of Background Art

A shift control device for an automatic transmission for a vehicle-use engine, for example, a shift control device of a plural-clutch-type transmission, is described in JP-A-2004-28117 which includes a shift manipulation mechanism for allowing a driver to give a neutral standby instruction to the transmission. When the neutral standby instruction is given from a shift manipulation mechanism, the shift control device changes over a transmission mechanism which belongs to a rotational power transmission system in which a clutch is released to a neutral state without performing a shift changeover operation.

The shift control device of the automatic transmission described in JP-A-2004-28117 brings the shift gears into a neutral state when the shift manipulation mechanism is in a neutral state. When the shift manipulation mechanism is changed over to a drive position, a shift-up operation corresponding to a vehicle speed is performed from the low-speed gear.

However, a situation may occur in which when a vehicle is not completely stopped on a descending slope or the like, the shift manipulation mechanism is changed over to the drive position from a state in which the shift manipulation mechanism is manipulated in the neutral position. In such a case, the transmission is changed over to the low-speed gear when the vehicle speed assumes a certain state. Thus, there may be a situation in which a large engine brake is generated thus giving a discomfort to a driver. Further, a load applied to clutches is also increased. Accordingly, there exists a task to obtain favorable shift feeling by reducing this engine brake and to decrease the load applied to the clutches.

SUMMARY AND OBJECTS OF THE INVENTION

The invention has been made in view of such drawbacks of the prior art, and it is an object of the invention to provide a sequential automatic transmission which can realize the enhancement of a shift feeling and the reduction of load of the clutch.

To achieve the above-mentioned object, an embodiment of the present invention provides a sequential automatic transmission including shift gears which transmit the rotation of an engine inputted by way of two clutches arranged in parallel to a transmission output shaft. The sequential automatic transmission further including a selection means which selects either one of a neutral position and a drive position as a shift position and a hydraulic control means which changes over the shift gears. The sequential automatic transmission is configured such that when the neutral position is selected as the shift position and a vehicle speed of a vehicle which mounts the sequential automatic transmission thereon is equal to or more than a preset low speed, the changeover of the shift gears is performed by the hydraulic control means based on a transmission map which sets shift stages using the vehicle speed and a throttle opening degree as parameters.

Further, according to an embodiment of the present invention the sequential automatic transmission is configured such that when the neutral position is selected as the shift position and the vehicle speed is equal or less than to the low speed, the shift gears are controlled to assume the neutral position by the hydraulic control means.

According to an embodiment of the present invention which possesses the above-mentioned technical features, for example, when a vehicle travels irrespective of the selection of the neutral position on a descending slope or the like, the shift gear is changed over to a shift stage which is suitable for a vehicle speed and a throttle opening degree during traveling. Further, when the shift position is changed over to the drive position from the neutral position using the selection means during the vehicle travels, the transmission can immediately transmit the rotation of the engine to a drive wheel with a suitable gear ratio at the changed shift stage. Further, a shift corresponding to the vehicle speed and the throttle opening degree is performed from the shift stage. Accordingly, when the clutch is connected in a vehicle traveling state, the traveling mode can be shifted to traveling at an optimum shift stage and, at the same time, a low shift stage is selected corresponding to the vehicle speed thus preventing sudden engine braking. Thus, a shift feeling can be enhanced. Further, an impact generated at the time of connecting the clutch is also alleviated thus reducing a load applied to the clutch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
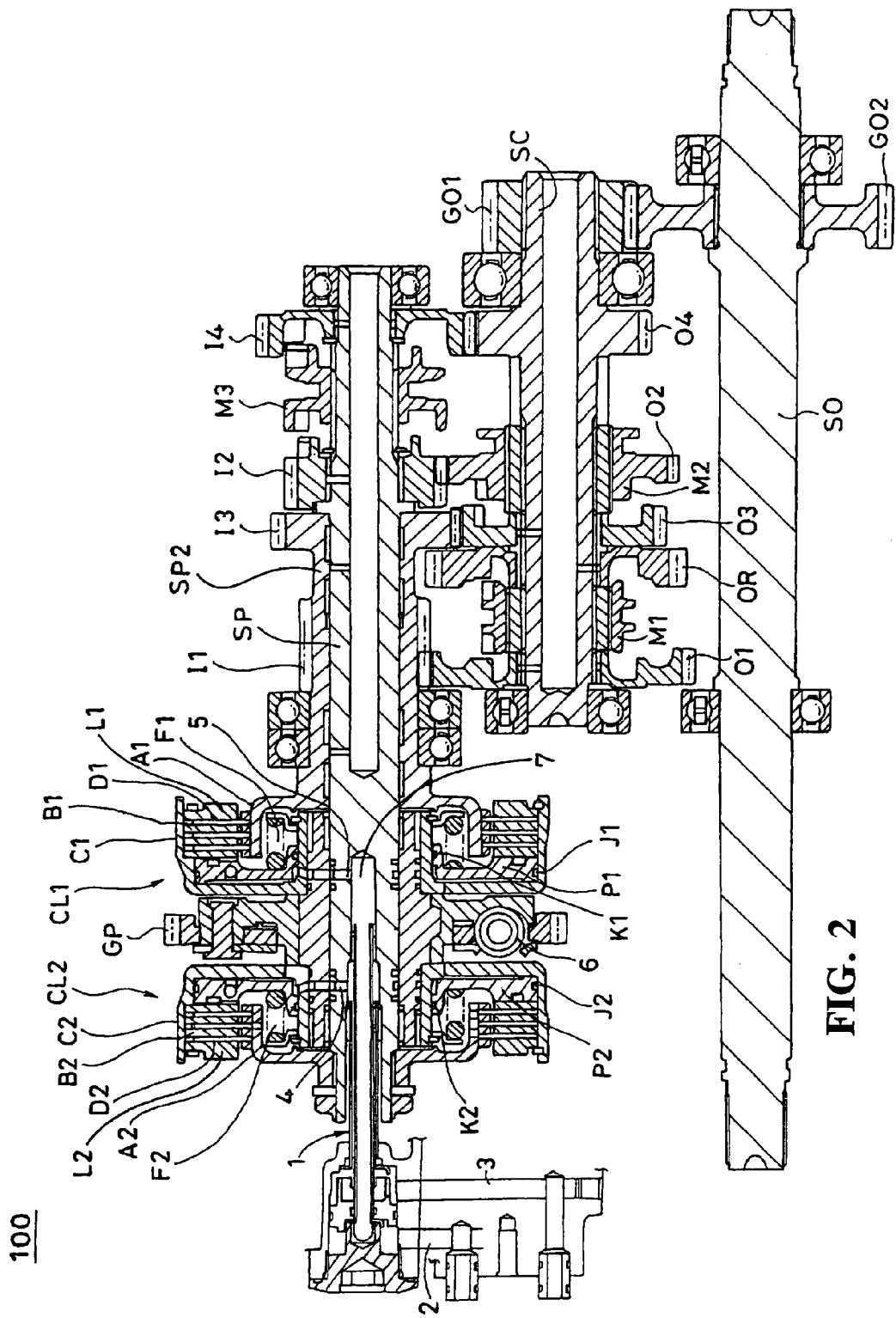
FIG. 2 illustrates a cross-sectional view of the automatic transmission of one embodiment according to the invention.

Hereinafter, the invention is explained in conjunction with drawings. FIG. 2 is an enlarged cross-sectional view of an essential part of an automatic transmission according to one embodiment of the invention. An automatic transmission 100 is a multi-stage transmission which includes four forward speeds and one backward speed. For example, the automatic transmission 100 is assembled in a four-cycle single-cylinder engine.

When a rotational speed of an engine arrives at a predetermined value (for example, 2000 rpm) and a start clutch not shown in the drawing is connected, a rotational driving force of the engine is inputted to the automatic transmission 100 from a primary gear GP. The driving force which is transmitted to the primary gear GP is finally transmitted to an output shaft SO by way of a primary shaft SP which constitutes a main shaft and a transmission gear train G which includes a plurality of pairs of the gears which are mounted on the primary shaft SP and a counter shaft SC which constitutes a sub shaft. To the primary gear GP, an impact absorbing mechanism which incorporates a spring 6 therein is assembled for absorbing the shock at the time of transmitting the driving force.

In a first clutch CL1 and a second clutch CL2 which constitute a twin clutch, clutch cases C1, C2 are arranged on the primary gear GP side and inner drums A1, A2 are arranged on a side remote from the primary gear GP, and the first clutch CL1 and the second clutch CL2 are arranged back to back. An oil pressure generating source for performing a hydraulic control of the first clutch CL1 and the second clutch CL2 and an oil passage which is connected to the oil pressure generating source are concentrated at a left end portion of the primary shaft SP.

Shift operations of the respective stages are performed by combining the ON/Off operation of the oil pressure which is applied to the first clutch CL1 and the second clutch CL2 and the sliding operations in the axial direction of a first sleeve M1, a second sleeve M2 and a third sleeve M3 which are formed of a jaw clutch and are engaged with a shift actuator (not shown in the drawing).

The first clutch CL1 and the second clutch CL2 have the same constitution which is constituted of the combination of same parts. Hereinafter, the constitution of the first clutch CL1 is explained as a typical example, and portions of the second clutch CL2 which correspond to portions of the first clutch CL1 are indicated with a parenthesis.

The first clutch CL1(CL2) includes a piston P1(P2) which is hermetically inserted into a bottom portion of the clutch case C1(C2) which is fixedly joined to the primary gear GP using an inner oil seal K1(K2) and an outer oil seal J1(J2). The piston P1(P2) is pushed in the right direction (the left direction) in the drawing when an working oil is supplied under pressure from an oil passage 5(4) which is formed in the primary shaft SP along an axis of the primary shaft SP, while the piston P1 (P2) is returned to an original position due to a resilient repulsive force of a spring F1 (F2) when the pressure of the working oil is lowered.

Further, on a right side (left side) of the piston P1(P2) in the drawing, three pressure plates B1(B2) which are connected to the clutch case C1(C2) fixedly in the rotational direction and slidably in the axial direction and a holding plate L1(L2) which is fixedly joined to the clutch case C1(C2) are arranged adjacent to the piston P1(P2). Further, between the pressure plates B1(B2) and the holding plate L1(L2), three clutch plates D1(D2) which are connected to the inner drum A1(A2) fixedly in the rotational direction and slidably in the axial direction are sandwiched with a slight gap.

Due to such a constitution, when the piston P1(P2) is pushed by the oil pressure and the pressure plates B1(B2) and the clutch plates D1(D2) are brought into contact with each other thus generating a friction force therebetween, a rotational driving force of the primary gear GP which rotates the clutch case C1(C2) is transmitted to the inner drum A1(A2).

An oil passage distributor 1 which adopts the duplicate pipe structure is inserted into and fixed to an oil gallery 7 which is formed in the primary shaft SP along an axis of the primary shaft SP. Accordingly, the oil pressure which is applied to a supply oil passage 2 passes through the oil passage 5 from an inner tube of the oil passage distributor 1 and drives the piston P1 of the first clutch CL1. On the other hand, the oil pressure which is applied to a supply oil passage 3 passes through an oil passage 4 defined between the inner tube and an outer tube of the oil passage distributor 1 and drives the piston P2 of the second clutch CL2.

The inner drum A1 which is arranged on the first clutch CL1 side is integrally formed with an outer primary shaft SP2, while the inner drum A2 which is arranged on the second clutch CL2 side is fixedly joined to the primary shaft SP. Further, on the outer primary shaft SP2 which is rotatably and pivotally supported on the primary shaft SP, a first speed drive gear I1 and a third speed drive gear I3 are integrally mounted. The first speed drive gear I1 and the third speed drive gear I3 are constantly meshed with a first speed driven gear O1 and a third speed driven gear O3 which are respectively rotatably and pivotally supported on the counter shaft SC.

Further, a second speed drive gear I2 and a fourth speed drive gear I4 which are rotatably and pivotally supported on the primary shaft SP are constantly meshed with a second speed driven gear O2 and a fourth speed driven gear O4 which are rotated together with the counter shaft SC respectively. An output gear GO1 which is fixedly joined to a right end portion of the counter shaft SC in the drawing is meshed with an output gear GO2 which is fixedly joined to an output shaft SO, and a reverse gear OR which is rotatably and pivotally supported on the counter shaft SC is constantly meshed with an input gear (not shown in the drawing) of a backward traveling output shaft.

Figure 3:
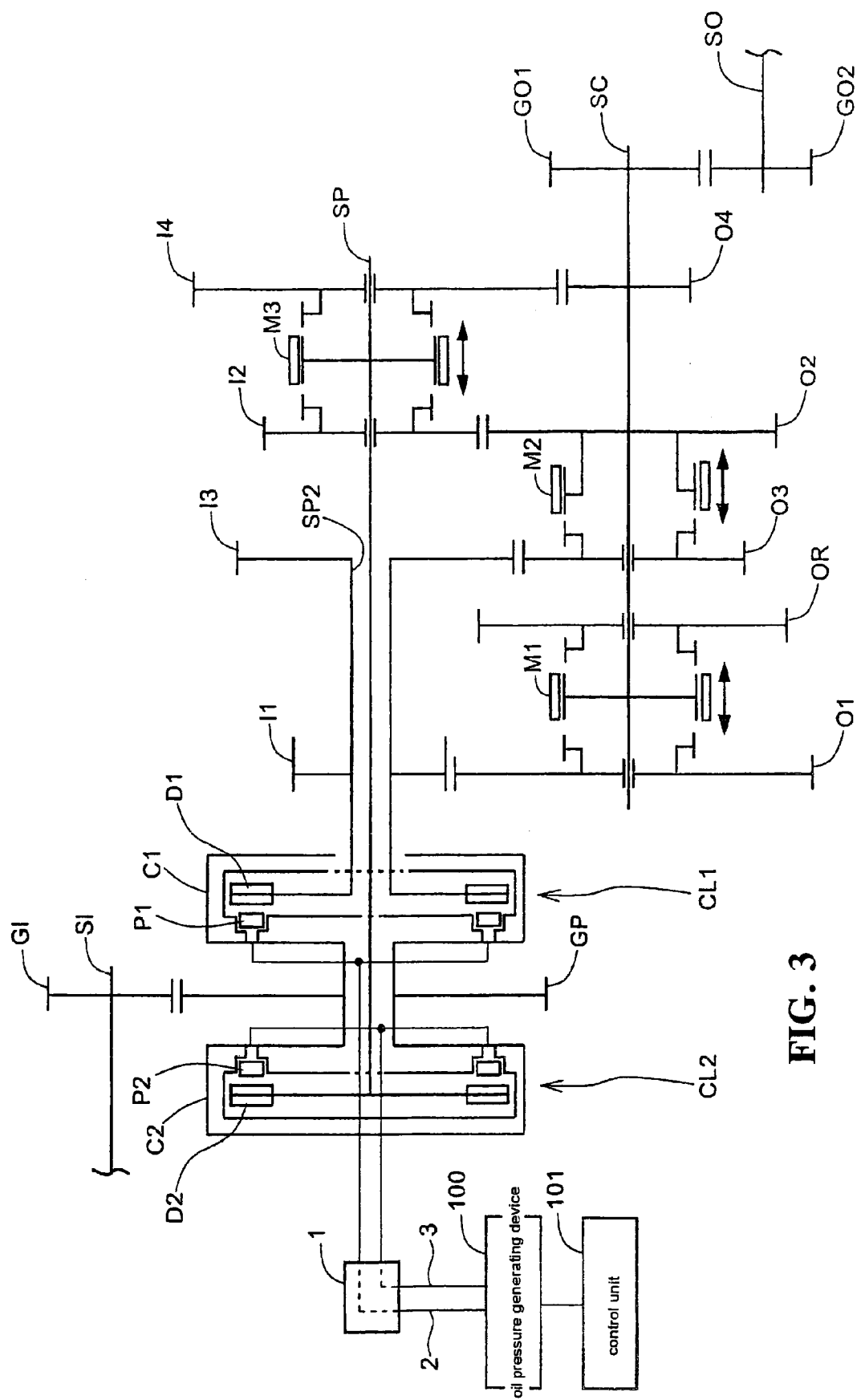
FIG. 3 illustrates a schematic view of one embodiment of the automatic transmission according to the invention.

Hereinafter, the shift operation of the automatic transmission 100 is explained. FIG. 3 is a schematic view of the automatic transmission 100 according to the invention. Symbols which are equal to the previously-used symbols indicate identical or similar parts. An oil pressure generating device 101 which respectively performs the hydraulic control on the first clutch CL1 and the second clutch CL2 independently is driven based on signals from a control unit 102. Further, sliding operations of the first sleeve M1 to the third sleeve M3 in the axial direction are performed by an actuator or the like not shown in the drawing in an interlocking manner with an operation of the twin clutch.

Hereinafter, a relationship between an ON/OFF operation of the oil pressure to the twin clutch at the respective shift stages and the sliding operations of the first sleeve M1 to the third sleeve M3 is explained. First of all, when the shift stage is at a neutral position, the application of the oil pressure to either one of the first clutch CL1 and the second clutch CL2 is interrupted, and there arises a state that the primary gear GP and the clutch cases Cl, C2 assume an idling state together with respect to the primary shaft SP. Next, when the shift stage is at a first speed, the oil pressure of working oil is applied to the first clutch CL1, and the rotational driving force of the primary gear GP is transmitted to the outer primary shaft SP2. Then, the first sleeve M1 which is connected to the counter shaft SC fixedly in the rotational direction and slidably in the axial direction is slid to the first speed driven gear O1 side and is connected to the first speed driven gear O1. Thus, the rotation of the first speed drive gear I1 is transmitted to the counter shaft SC by way of the first speed driven gear O1 and the first sleeve M1. The rotation of the counter shaft SC is transmitted to the output shaft SO by way of the output gear GO1 and the output gear GO2.

Next, when the shift stage is at a second speed, a supply destination of the working oil is changed over to the second clutch CL2 from the first clutch CL1. Thus, the oil pressure from a switching solenoid 155 is connected to a switching valve 154, and a working oil pressure force from a linear solenoid valve 152 is connected to the second clutch CL2. Accordingly, the second clutch CL2 is operated and the rotational driving force of the primary gear GP is transmitted to the primary shaft SP. At the same time, the third sleeve M3 which is connected to the primary shaft SP fixedly in the rotational direction and slidably in the axial direction is slid to the second speed drive gear I2 side and is connected to the second speed drive gear I2. Thus, the rotational driving force is transmitted to the counter shaft SC by way of a gear train which includes the second speed drive gear I2 and the second speed driven gear O2.

Further, when the shift stage is at a third speed, the supply destination of the oil pressure is changed over to the first clutch CL1 from the second clutch CL2 again. Thus, the second sleeve M2 which is connected to the counter shaft SC fixedly in the rotational direction and sidably in the axial direction is slid to the third speed driven gear O3 side and is connected to the third speed driven gear O3. Accordingly, the rotational driving force is transmitted to the counter shaft SC by way of a gear train which includes the third speed drive gear I3 and the third speed driven gear O3.

Further, when the shift stage is at a fourth speed, the supply destination of the oil pressure is changed over to the second clutch CL2 from the first clutch CL1 again. When the second clutch CL2 is operated, the rotational driving force of the primary gear GP is transmitted to the primary shaft SP. Thus, the third sleeve is slid to the fourth speed drive gear I4 side and is connected to the fourth speed drive gear I4. Accordingly, the rotational driving force is transmitted to the counter shaft SC by way of a gear train that includes the fourth speed drive gear I4 and the fourth speed driven gear O4.

In backward traveling, the oil pressure is connected to the first clutch CL1 in the same manner as the shift operation at the first speed. At the same time, the first speed driven gear O1 which is slidable in the axial direction is connected to the reverse gear OR side, and power is transmitted to the output shaft SO by way of a backward traveling idle gear not shown in the drawing.

As described above, the automatic transmission 100 is configured such that the respective pairs of the shift gears are constantly meshed with each other and a disconnection/connection state of the rotational driving force to the neighboring shift gears is alternately performed by two clutches. Thus, it is possible to reduce the shift shock and, at the same time, a shift manipulation can be performed quickly.

An electronic control part of the automatic transmission 100 is explained. The electronic control part of this embodiment controls a shift operation corresponding to a neutral position, a drive position or a reverse position which is selected in accordance with a manipulation of a range selection lever or selection means. At the drive position, the shift operation is performed by a sequential operation in which a shift stage is changed over within a range of from the first speed to the fourth speed on a one by one basis.

Figure 4:
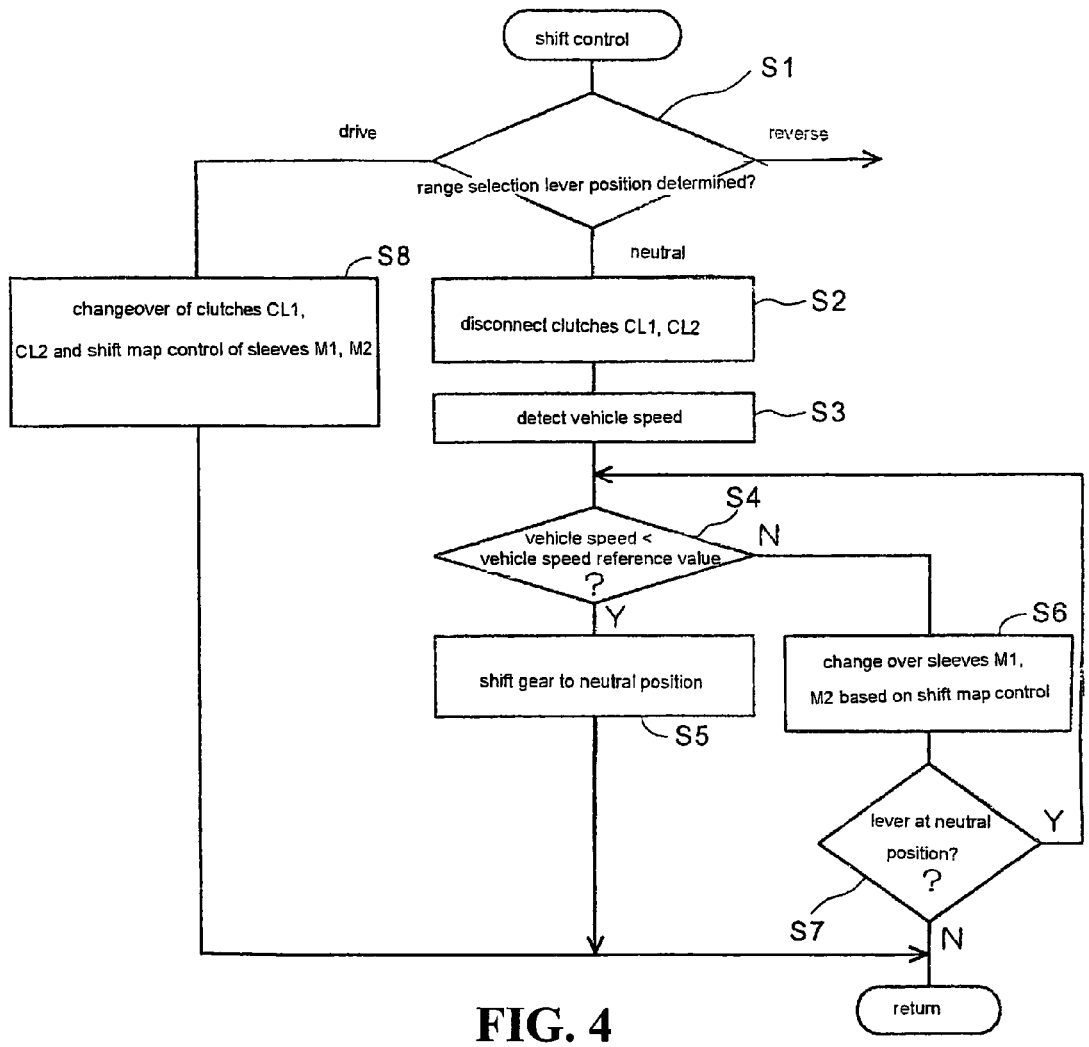
FIG. 4 illustrates a flowchart showing the manner of operation of an electronic control part.

FIG. 4 is flowchart showing the manner of operation of the electronic control part. In FIG. 4, in step S1, a position of the range selection lever 40 (see FIG. 1) is determined. The determination is performed based on which one of the contacts which are provided for the respective mode selection positions of the range selection lever 40 is closed (being turned ON). When the range selection lever 40 is arranged at a neutral position, processing advances to an operation that changes over the automatic transmission 100 to the neutral position. That is, first of all, in step S2, the first clutch CL1 and the second clutch CI2 are disconnected. In step S3, the vehicle speed is detected by a well-known vehicle speed detection means. In step S4, it is determined whether the detected vehicle speed is less than a vehicle speed reference value (for example, 3 km/hour) or not, that is, whether the detected vehicle speed is a speed which is substantially considered as a stop of the vehicle or not.

When the vehicle speed is less than the preset vehicle speed reference value, the gears are shifted to a neutral state in step S5. When the vehicle speed is equal to or more than the vehicle speed reference value, the processing advances to step S6, wherein the gears are changed over by operating the first sleeve M1 and the second sleeve M2 based on a shift map control which determines the shift stage in accordance with the shift map described later. In step S7, it is determined whether the range selection lever 40 is held at the neutral position or not. When the range selection lever 40 is at the neutral position, the processing advances to step S4, and when the range selection lever 40 is at a position other than the neutral position, the processing returns to step S1. In the shift map control in step S6, the shift stage is updated corresponding to the vehicle speed and a throttle opening degree.

When the range selection lever 40 is at the drive position, the processing advances to step S8 from step S1. In step S8, the changeover operation of the first clutch CL1 and the second clutch CL2 and the changeover operation of the gears attributed to the movement of the first sleeve M1 and the second sleeve M2 based on the shift map control are performed.

When the range selection lever 40 is at the reverse position, the automatic transmission 100 is controlled to allow the vehicle to travel in the backward direction. However, the processing at the time of performing backward traveling does not constitute the essential part of the invention. Thus, the explanation of the processing at the time of performing backward traveling is omitted.

Figure 5:
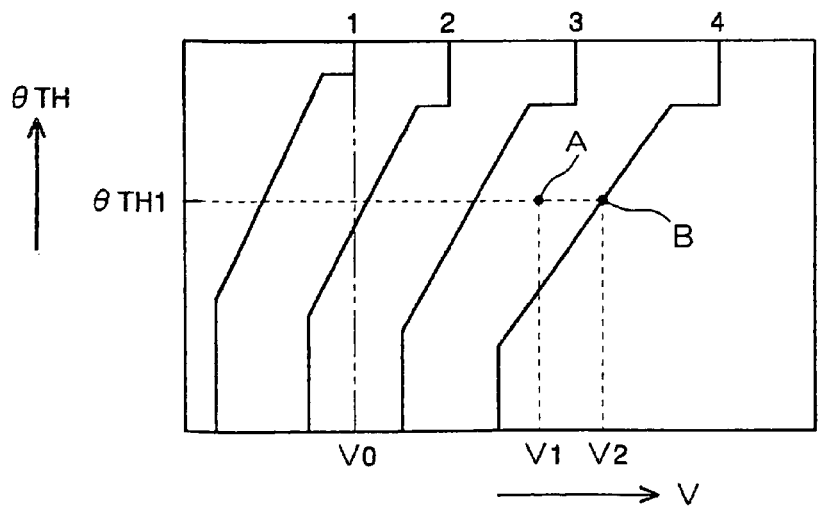
FIG. 5 illustrates a view showing one example of a shift map.

FIG. 5 is a view showing one example of the shift map. In the drawing, a throttle opening degree $\theta TH$ is taken on an axis of ordinates and a vehicle speed V is taken on an axis of abscissas. Since the number of gear change stages (first speed to fourth speed) are determined using the vehicle speed V and the throttle opening degree $\theta TH$ as parameters, the gear change stage is decided in accordance with the shift map based on the vehicle speed V and the throttle opening degree $\theta TH$. For example, at a point A where the throttle opening degree $\theta TH$ is $\theta TH1$ and the vehicle speed is V1, the gear change stage is the third speed. When the vehicle speed is increased in such a state and the vehicle speed moves to a point B which corresponds to the vehicle speed V2, the gear change stage is shifted to the fourth speed. Here, it may be preferable to prepare different shift maps corresponding to the shift up operation and the shift down operation.

Figure 1:
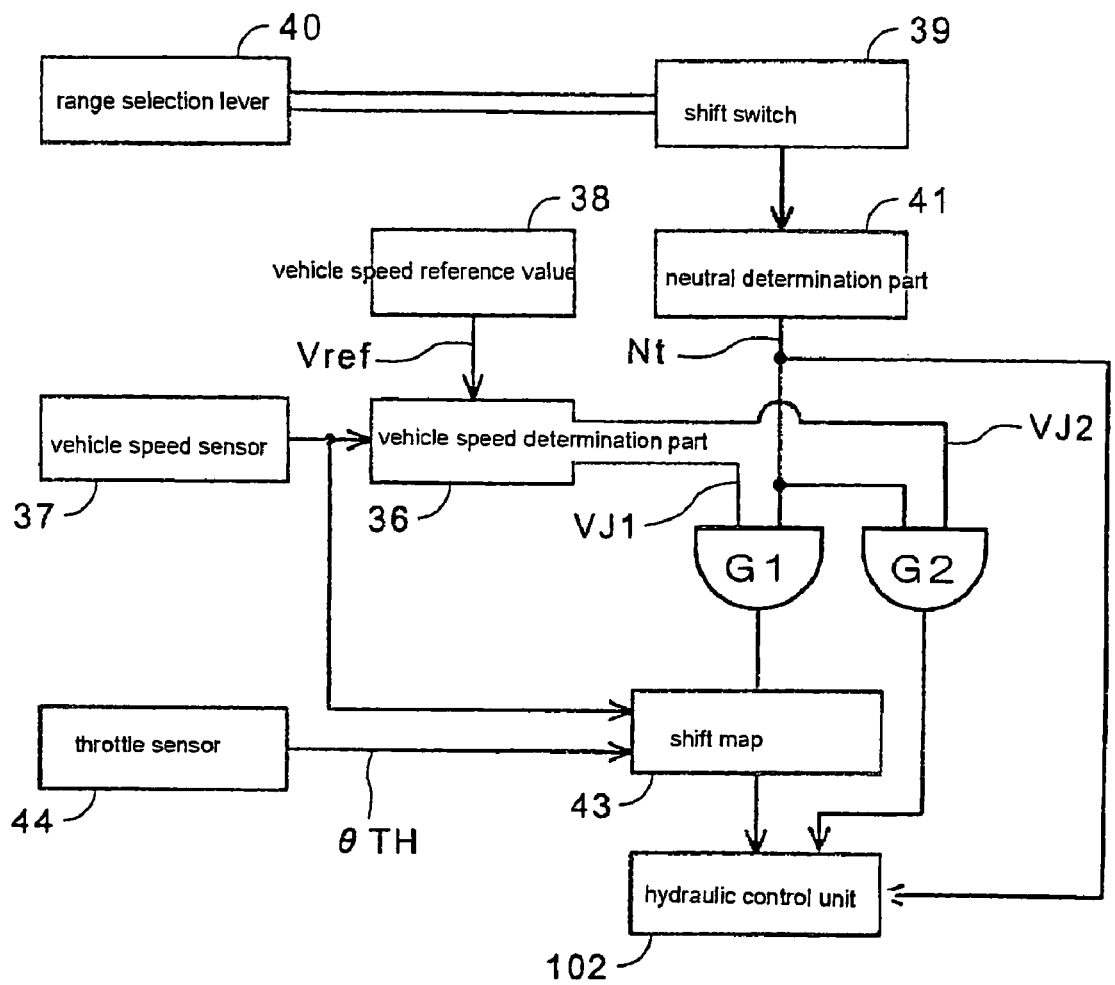
FIG. 1 illustrates a block diagram showing functions of essential parts of a control part of an automatic transmission of one embodiment according to the invention.

FIG. 1 is a block diagram showing functions of essential parts of the electronic control part. In FIG. 1, a vehicle speed determination part 36 determines whether the vehicle speed V detected by a vehicle speed sensor 37 is less than a vehicle speed reference value Vref stored in a memory part 38 or not. When the vehicle speed V is less than the vehicle speed reference value Vref, the electronic control part outputs a determination signal VJ1, while when the vehicle speed V is not less than the vehicle speed reference value Vref, the electronic control part outputs a determination signal VJ2.

The gear change switch 39 outputs signals (voltage values) indicative of the neutral position, the drive position, and the reverse position corresponding to the manipulation of the range selection lever 40. When the neutral determination part 41 detects the neutral position based on the output of the gear change switch 39, the neutral determination part 41 outputs the neutral signal Nt. The neutral signal Nt is inputted to the hydraulic control unit 102 so as to operate the hydraulic control unit 102 such that the first clutch CL1 and the second clutch CL2 are disconnected.

The determination signal VJ1 outputted from the vehicle speed determination part 36 is inputted to the shift map 43 via the gate G1 which is opened in response to the neutral signal Nt. On the other hand, the determination signal VJ2 is inputted to the hydraulic control unit 102 via another gate G2 that is opened in response to the neutral signal Nt. In response to the determination signal VJ2, the hydraulic control unit 102 changes over the gear of the transmission 100 to the neutral position.

The shift map 43 inputs the signal indicative of the gear change stage to the hydraulic control unit 102 based on the vehicle speed V and the throttle opening degree θTH of the engine detected by the throttle sensor 44. The hydraulic control unit 102 changes over the gears of the transmission 100 to the gear change stage inputted from the shift map 43.

The functions of the neutral determination part 41, the vehicle speed determination part 36 and the gates G1, G2 of the control part can be realized using a micro computer. Further, the memory part 38 which stores the vehicle-speed reference value and the shift map 43 may be formed of a ROM.

Here, it is preferable to set the vehicle speed reference value Vref to a value less than a speed suitable for selecting the gear change stage of first speed. For example, in setting the shift map 43, the vehicle speed reference value Vref is set to a value less than a maximum value of the vehicle speed V corresponding to the first speed. That is, to explain in conjunction with FIG. 5, the vehicle speed reference value Vref is set to a value less than the vehicle speed V0.

In this manner, according to this embodiment, when the vehicle speed V is equal to or more than the vehicle speed reference value Vref in a state wherein the range selection lever 40 is manipulated to assume the neutral position, that is, when it is determined that the vehicle is actually traveling, the gear change stage is changed over to the position corresponding to the vehicle speed V and the throttle opening degree θTH. It is needless to say that the first clutch CL1 and the second clutch CL2 are disconnected. Due to such a control, even when the changeover manipulation of the range selection lever 40 is performed from the neutral position to the drive position in a vehicle traveling state, that is, in a state that the vehicle speed V is equal to or more than the vehicle speed reference value Vref, the gears are changed over to the number of shift stage corresponding to the vehicle speed V Thus, there is no possibility that a sudden engine brake is applied to the transmission, and it is possible to prevent an excessively large load from being applied to the clutches due to a large engine brake.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sequential automatic transmission including shift gears for transmitting the rotation of an engine inputted by way of a first clutch and a second clutch arranged in parallel to a transmission output shaft, the sequential automatic transmission further comprising:
   a selection lever for selecting either one of a neutral position and a drive position as a shift position; and
   a hydraulic control unit for changing over the shift gears among multiple shift stages;
   wherein the sequential automatic transmission is configured such that when the neutral position is selected as the shift position and a vehicle speed V of a vehicle which mounts the sequential automatic transmission thereon is equal to or more than a preset low speed Vref, a changeover of the shift gears to one of the shift stages is performed by the hydraulic control unit using a transmission map which sets the shift stages using the vehicle speed V and a throttle opening degree as parameters,
   wherein the preset low speed Vref is set to a value less than a maximum value of the vehicle speed V corresponding to a first speed, the first speed being the shift stage which enables the vehicle speed V to be lower than when the shift gears are in others of the shift stages.

2. The sequential automatic transmission according to claim 1, wherein the sequential automatic transmission is configured such that when the neutral position is selected as the shift position and the vehicle speed V is equal to or less than the low speed Vref, the shift gears are controlled to assume the neutral position by the hydraulic control unit.

3. The sequential automatic transmission according to claim 1, and further including a first inner drum operatively connected to the first clutch and being connected to an outer primary shaft and a second inner drum being operatively connected to the second clutch and being joined to a primary shaft.

4. The sequential automatic transmission according to claim 3, and further including a first speed drive gear and a third speed drive gear being mounted relative to said primary shaft and being in mesh with a first speed driven gear and a third speed driven gear operatively connected to a counter shaft.

5. The sequential automatic transmission according to claim 3, and further including a second speed drive gear and a fourth speed drive gear operatively connected to the primary shaft and being in mesh with a second speed driven gear and a fourth speed driven gear operatively connected to a counter shaft.

6. The sequential automatic transmission according to claim 5, and further including an output gear operatively connected to the output shaft and a reversing gear operatively connected to the counter shaft.

7. The sequential automatic transmission according to claim 1, and further including a micro computer including a neutral determination part, a vehicle speed determination part, a memory part, and a control part having a pair of gates G1, G2.

8. The sequential automatic transmission according to claim 1, and further the first clutch and the second clutch are disposed a different positions in an axial direction of the sequential automatic transmission.

9. The sequential automatic transmission according to claim 1, and further including a primary gear disposed between the first clutch and the second clutch.

10. A sequential automatic transmission comprising:
   a transmission output shaft;
   a first clutch and a second clutch arranged in parallel to the transmission output shaft;
   shift gears for transmitting the rotation of an engine inputted by way of the two clutches;

a selection lever for selecting one of a neutral position and a drive position as a shift position; and a hydraulic control unit for changing over the shift gears among multiple shift stages;

wherein the sequential automatic transmission is configured such that when the neutral position is selected as the shift position and a vehicle speed V of a vehicle which mounts the sequential automatic transmission thereon is equal to or more than a preset low speed Vref, a changeover of the shift gears to one of the shift stages is performed by the hydraulic control unit using a transmission map which sets the shift stages using the vehicle speed V and a throttle opening degree as parameters, wherein the preset low Vref is set to a value less than a maximum value of the vehicle speed V corresponding to a first speed, the first speed being the shift stage which enables the vehicle speed V to be lower than when the shift gears are in others of the shift stages.

11. The sequential automatic transmission according to claim 10, wherein the sequential automatic transmission is configured such that when the neutral position is selected as the shift position and the vehicle speed V is equal to or less than the low speed Vref, the shift gears are controlled to assume the neutral position by the hydraulic control unit.

12. The sequential automatic transmission according to claim 10, and further including a first inner drum operatively connected to the first clutch and being connected to an outer primary shaft and a second inner drum being operatively connected to the second clutch and being joined to a primary shaft.

13. The sequential automatic transmission according to claim 12, and further including a first speed drive gear and a third speed drive gear being mounted relative to said primary shaft and being in mesh with a first speed driven gear and a third speed driven gear operatively connected to a counter shaft.

14. The sequential automatic transmission according to claim 12, and further including a second speed drive gear and a fourth speed drive gear operatively connected to the primary shaft and being in mesh with a second speed driven gear and a fourth speed driven gear operatively connected to a counter shaft.

15. The sequential automatic transmission according to claim 14, and further including an output gear operatively connected to the output shaft and a reversing gear operatively connected to the counter shaft.

16. The sequential automatic transmission according to claim 10, and further including a micro computer including a neutral determination part, a vehicle speed determination part, a memory part, and a control part having a pair of gates G1, G2.

17. The sequential automatic transmission according to claim 10, and further the first clutch and the second clutch are disposed a different positions in an axial direction of the sequential automatic transmission.

18. The sequential automatic transmission according to claim 10, and further including a primary gear disposed between the first clutch and the second clutch.

19. The sequential automatic transmission according to claim 10, wherein the shift gears include four shift gears, wherein the maximum value of the vehicle speed V corresponding to the first speed is less than a minimum value of vehicle speed V corresponding to a third speed, and a maximum value of the vehicle speed V corresponding to a second speed is less than a minimum value of vehicle speed V corresponding to a fourth speed.

20. A sequential automatic transmission including shift gears for transmitting the rotation of an engine inputted by way of a first clutch and a second clutch arranged in parallel to a transmission output shaft, the sequential automatic transmission further comprising:

a selection lever for selecting either one of a neutral position and a drive position as a shift position; and a hydraulic control unit for changing over the shift gears;

wherein the sequential automatic transmission is configured such that when the neutral position is selected as the shift position and a vehicle speed V of a vehicle which mounts the sequential automatic transmission thereon is equal to or more than a preset low speed Vref, a changeover of the shift gears to one of the shift stages is performed by the hydraulic control unit using a transmission map which sets the shift stages using the vehicle speed V and a throttle opening degree as parameters, wherein the preset low speed Vref is set to a value less than a maximum value of the vehicle speed V corresponding to a first speed, wherein the shift gears include four shift gears, wherein the maximum value of the vehicle speed V corresponding to the first speed is less than a minimum value of vehicle speed V corresponding to a third speed, and a maximum value of the vehicle speed V corresponding to a second speed is less than a minimum value of vehicle speed V corresponding to a fourth speed.

* * * * *